United States Patent [19]

Staudenrausch et al.

[11] Patent Number: 5,145,450
[45] Date of Patent: Sep. 8, 1992

[54] METHOD AND APPARATUS FOR SEPARATING A CONTINUOUS STRING OF SAUSAGE MEAT INTO INDIVIDUAL SAUSAGES

[75] Inventors: Georg Staudenrausch, Biberach; Gerhard Müller, Schlemmerhofen, both of Fed. Rep. of Germany

[73] Assignee: Albert Handtmann Maschinenfabrik GmbH & Co. KG, Fed. Rep. of Germany

[21] Appl. No.: 648,519

[22] Filed: Jan. 30, 1991

[30] Foreign Application Priority Data

Jan. 31, 1990 [DE] Fed. Rep. of Germany ... 9001075[U]

[51] Int. Cl.⁵ ............................................. A22B 3/08
[52] U.S. Cl. ........................................ 452/47; 452/46; 452/30; 452/31
[58] Field of Search ............... 452/47, 48, 46, 31, 452/30

[56] References Cited

U.S. PATENT DOCUMENTS 4,730,367 3/1988 Vinokur ................................. 452/47

FOREIGN PATENT DOCUMENTS

| 2214413 | 8/1974 | European Pat. Off. |
| 2605745 | 8/1977 | European Pat. Off. |
| 3104099 | 9/1982 | European Pat. Off. |
| 3323659 | 1/1985 | European Pat. Off. |
| 3408859 | 9/1985 | European Pat. Off. |

Primary Examiner—Bruce M. Kisliuk
Assistant Examiner—Lawrence Cruz
Attorney, Agent, or Firm—Finnegan, Henderson, Farabow, Garrett & Dunner

[57] ABSTRACT

In a method and apparatus for making sausages in the form of a continuous string with subsequent separation thereof into individual sausages or into groups of interconnected sausages, means are provided for varying the separating operating in a simple manner according to the length of the sausage and the number of interconnected sausages in groups thereof desired, while still ensuring an accurated separating perfomance. In the spearating operation separator elements are mounted opposite one another on either side of the string that revolve synchronously in the conveying direction along respective opposite circular paths, their revolving speed being variable over the non-operative sector of their revolutions relative to the operative sector where their speed is compatible with the sausage conveying speed.

18 Claims, 6 Drawing Sheets

METHOD AND APPARATUS FOR SEPARATING A CONTINUOUS STRING OF SAUSAGE MEAT INTO INDIVIDUAL SAUSAGES

BACKGROUND OF THE INVENTION

This invention relates to a method and apparatus for making sausages in a continuous string and separating the string into individual sausages or groups of interconnected sausages.

An apparatus of this type is known from German patent application 31 04 099. In this apparatus, a sausage strand provenient from a stuffing machine is advanced between two endless belts of a conveyor device. Secured to each of the endless belts are squeezer elements meeting one another at the location of the return pulleys to squeeze the sausage strand at respective locations to form a constriction and thereby subdivide the strand into a string of interconnected sausages. Disposed downstream of the conveyor belts is a separating device comprising two parallel drive shafts mounted at spaced locations on opposite sides of the sausage strand for synchronous rotation in opposite directions and disposed substantially perpendicular to the conveying direction of the sausage string, each drive shaft being provided with two radially projecting separator arms cooperatively meeting one another for the separating operation. The separator arms of one drive shaft are provided with blades, while the separator arms of the other drive shaft are provided with suitable countersupports. For the separating operation the cutting edge of a blade approaches the respective countersupport to thereby cut through the constriction between two sausages. A timing belt connects the endless belts to the drive gear of one of the drive shafts of the separating device, the two drive shafts themselves being operatively interconnected by meshing gears.

In this manner it is ensured that the separator arms revolve in synchronism with the squeezer elements, so that the separation occurs always at the constriction between two sausages. The construction of the separating device in the form of synchronously counterrotating separator arms provided with blades and countersupports results in the advantage that the blades and countersupports move at the same speed as the sausage string, so that the blades and countersupports cooperate with one another in a meshing engagement with respective constrictions between two sausages.

In apparatus of this type, when it is desired to vary the length of the sausages or the number of sausages in a group thereof, the mechanical alterations and adjustments required to achieve this are rather difficult and onerous.

It is therefore an object of the invention to provide a method and apparatus which permits sausages or groups of sausages to be accurately separated irrespective of the length of the sausages, of the number of interconnected sausages and of the sausage conveying speed, without requiring any difficult adjustments or modifications.

SUMMARY OF THE INVENTION

This object is attained according to the invention by a method for making sausages in a continuous string and for separating the string into individual sausages or groups of interconnected sausages, wherein a sausage strand is made by a stuffing machine and subsequently divided into interconnected sausages by a twisting device, the thus divided sausages being retained against rotation and conveyed on at a determined conveying speed while being maintained in longitudinal alignment. The interconnected sausages are then separated by means of separator elements disposed opposite one another and revolving in synchronism along opposite circular paths in the conveying direction, the revolving speed of the separator elements being variable over their non-operative revolution sector while being adjusted to the sausage conveying speed in the operative engagement sector.

The method permits both the length of the sausages and the number of interconnected sausages in a group to be varied rapidly and in a simple manner without degradation of the accuracy of the sausage separating operation.

The method may be still further improved by pre-dividing the sausages prior to the twisting operation by means of squeezer elements mounted for synchronous and opposite revolution along respective circular paths in the conveying direction, in a manner similar to the separator elements, with their revolving speed being variable along their non-operative revolution sector while being adjusted to the sausage conveying speed at their operative engagement sector.

In this manner it is possible to separate the sausage string into individual sausages by causing the separator elements and the squeezer elements to revolve at the same speed, or to separate the sausage string into groups of interconnected sausages by reducing the revolving speed of the separator elements relative to that of the squeezer elements.

BRIEF DESCRIPTION OF THE DRAWINGS

Further characteristics and advantages of the invention will become evident from the description, an example of which is shown in the drawings, wherein.

DETAILED DESCRIPTION OF THE INVENTION

Figure 1:
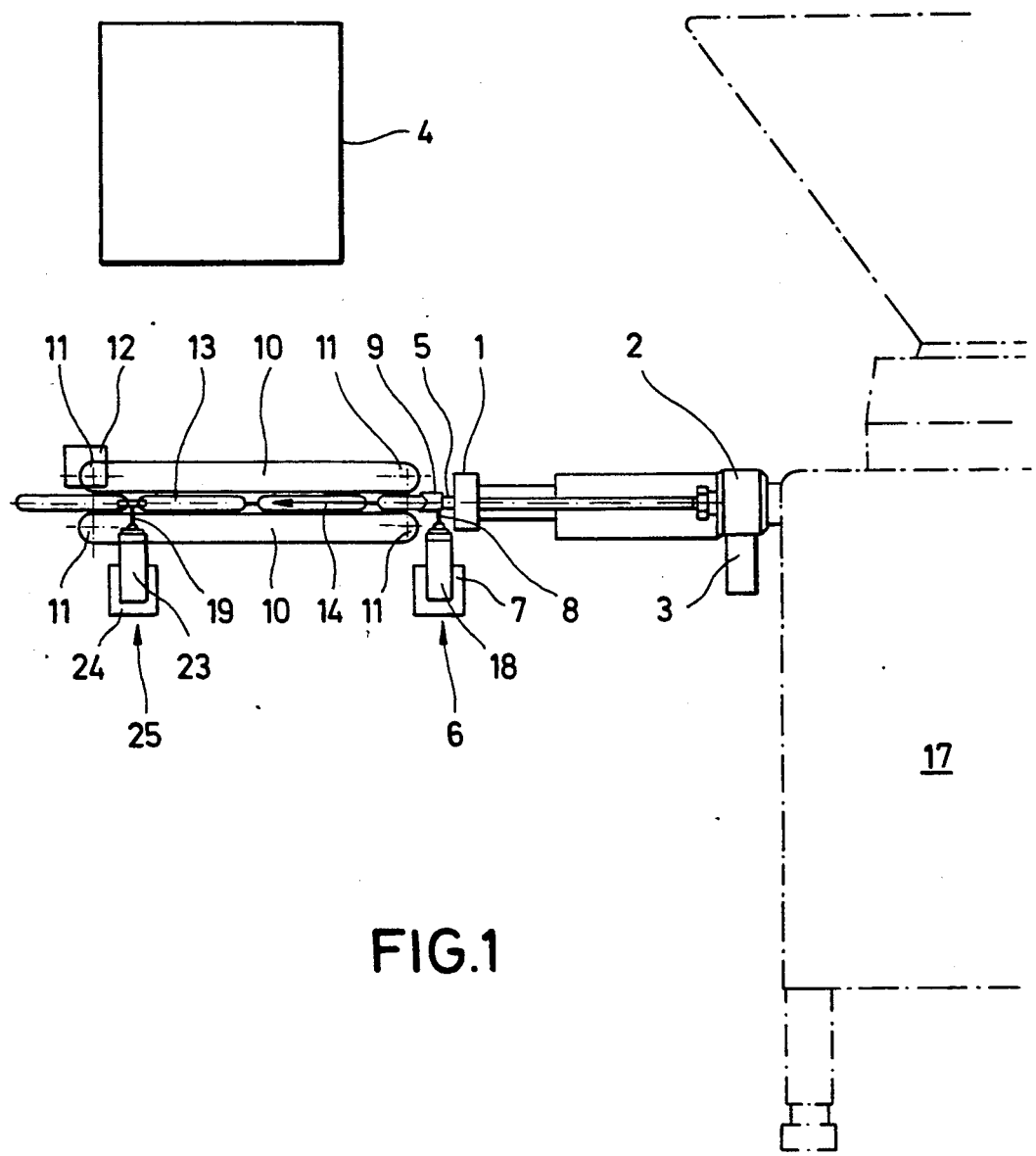
FIG. 1 is a diagrammatic sideview of an apparatus according to the invention.

Depicted in FIG. 1 in dash-dot lines is a sausage stuffing machine 17 operable to produce a continuous sausage strand of a sausage skin filled with sausage meat in the conventional manner. The thus formed sausage strand 5 is advanced through the center opening of twisting means comprising a brake ring 1 adapted to be rotated by a twister drive transmission 2 so that sausage strand 5 is also rotated or twisted to divide it into a string of interconnected sausages with twisted ends.

Twister drive transmission 2 is driven by an electric motor 3 the rotational speed of which is controlled by a control means such as a conventional electronic or hydraulic control unit 4.

In the embodiment shown, sausage strand 5 first enters squeezing means for pre-dividing the sausages prior to the twisting operation and disposed immediately downstream of brake ring 1. The squeezing means comprises two squeezer units 6 only 1 of which is shown in FIG. 1. The two squeezer units 6 are connected to an electric motor 7 the rotary speed of which is also controlled by electronic control unit 4.

Structurally combined with electric motor 7 is a transmission 18 having two drive shafts 8 only one of which is shown. Each drive shaft 8 carries a squeezer element 9 fixedly secured thereto in a manner not shown in detail.

Disposed downstream of the squeezing means is a conveying means comprising two endless conveyor belts 10. Conveyor belts 10 are guided around return pulleys 11, respective ones of which act as drive pulleys connected to a variable-speed electric motor 12 the speed of which is also controlled by electronic control unit 4.

Conveyor belts 10 revolve in opposite directions to thereby convey the divided sausages 13 in the direction of arrow 14, conveyor belts 10 being at the same time effective to prevent sausages 13 from being rotated.

Figure 2:
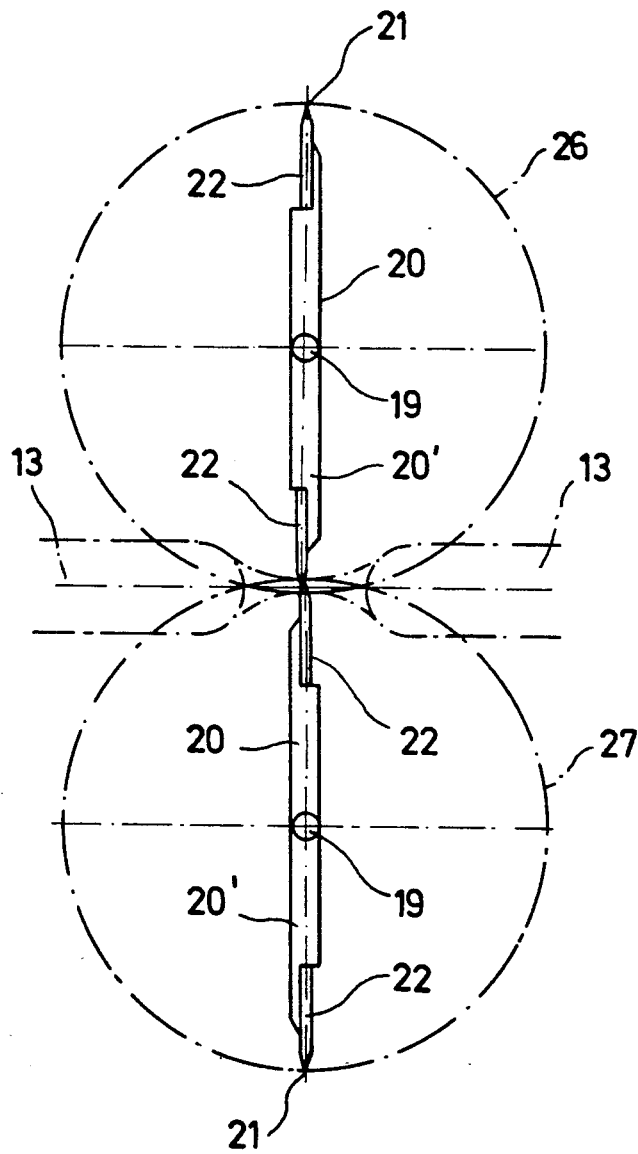
FIG. 2 is a diagrammatic top plan view of a separating device.

As shown in FIGS. 1 and 2, sausages 13 are then separated by a separating means or device 25. The drive mechanism of the device comprises two parallel drive shafts 19 mounted at spaced locations on opposite sides of the sausage string for synchronous rotation in opposite directions about respective axes extending perpendicular to the conveying direction of the sausage string.

In the embodiment shown in FIG. 2, each drive shaft 19 carries two separator arms 20 and 20' mounted on its end so as to project radially therefrom in opposite directions. At its free end, each separator arm 20 or 20', respectively, carries a blade 22 having a radially outwards facing cutting edge 21.

Drive shafts 19 are connected to a transmission 23 structurally combined with an electric motor 24 the rotational speed of which is again controlled by electronic control unit 4.

The separating device may thus be of the same construction as the squeezer units 6. Control unit 4 may be operable to control separating device 25 in proportion to the operation of squeezer units 6. From FIG. 2 it is evident that the revolving paths 26 and 27 of blades 22 overlap one another by an amount of preferably about 1 to 2 mm.

Figure 3:
FIG. 3 shows a pair of the blades of the separating device of FIG. 2 in meshing cooperation.

FIG. 3 illustrates the manner in which blades 22 meet in mutual cooperation at the separation point.

Figure 7:
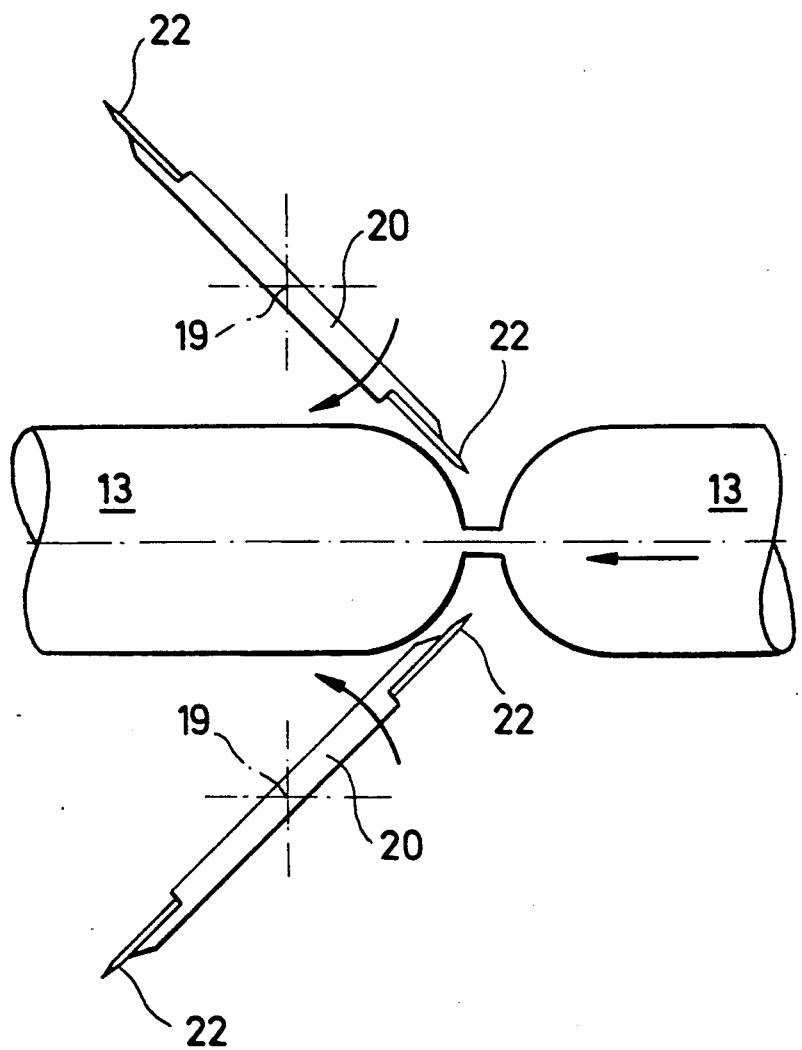
FIG. 7 shows the meshing engagement of two separator blades with a constriction between two sausages.

Prior to the separating operation, separator arms 20 and 20' with their blades 22 are in an angular position relative to one another, with the ends of blades 22 already aligned with a constriction between two sausages 13 in oblique orientation as shown in FIG. 7.

Shown in FIG. 3 in dash-dotted lines are the successive positions of the two cooperating blades 22 immediately prior to the separating cut and subsequent thereto. At the instant of the cutting operation, the two blades 22 may approach one another to a minimum distance therebetween of about 0.1 mm, this position being depicted in solid lines. It will be seen that one of blades 22 is slightly offset relative to the other one, so that they pass through the cutting position in close succession. In this position an angle of about 20° formed by the two cutting edges has been found to be particularly effective.

The cutting edges may be ground to a symmetric shape as illustrated in FIG. 3.

Figure 4:
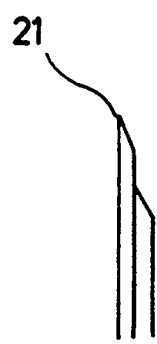
FIG. 4 shows a detail of a blade.

The blades may of course also be ground from only one side as shown by way of example in FIG. 4.

Figure 5:
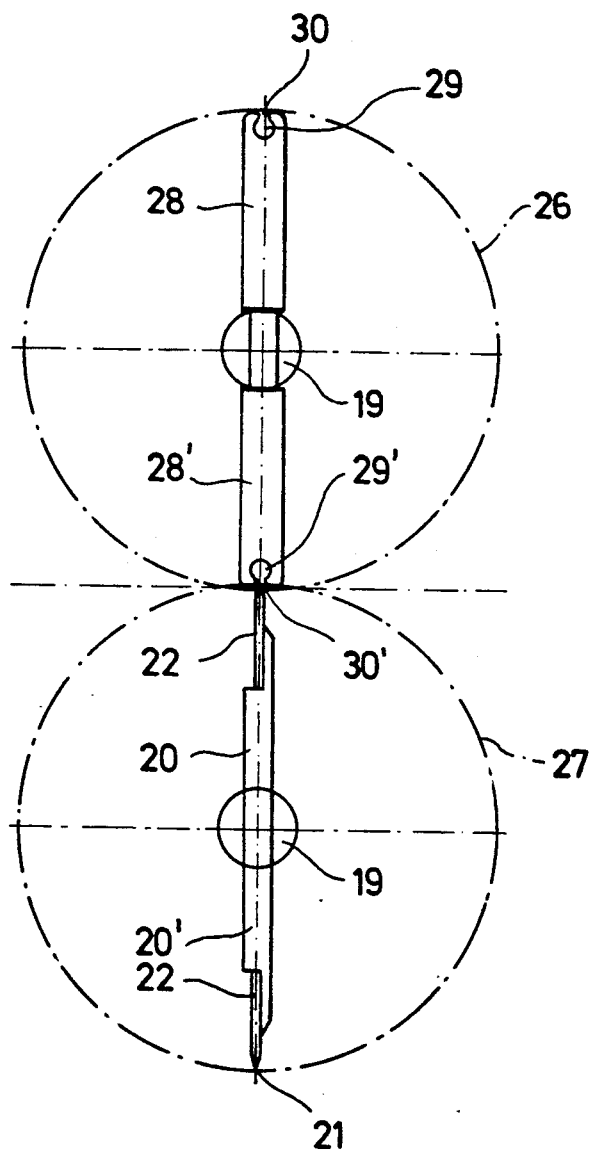
FIG. 5 is a top plan view of a modified embodiment of the separating device.

In the separating device diagrammatically illustrated in FIG. 5, one of the two drive shafts 19 is again provided with two radially projecting separator arms 20, 20' with respective blades 22 at diametrally opposite positions.

The other drive shaft 19 is instead provided with two diametrally opposite and radially outwards projecting countersupports 28 and 28', the ends of which are formed with respective recessed rim portions 29 and 29', respectively, defining a radially outwards opening slot 30 and 30', respectively.

Slots 30, 30' are preferably of a width of about 1 to 2 mm, and receive therein the cutting edge 21 of the associated blade 22 to a depth of about 1 mm.

Figure 6:
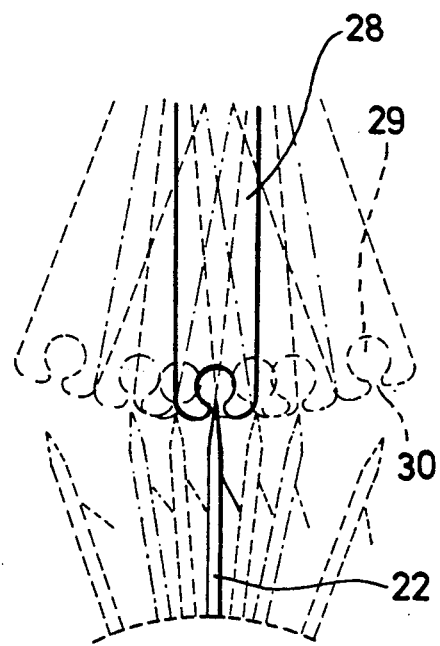
FIG. 6 shows the cooperation of a blade with a countersupport of the separating device of FIG. 5.

This position of blade 22 and countersupport 28' is diagrammatically illustrated in solid lines in FIG. 6. Shown in dash-dotted lines in this figure are the successive positions of a blade 22 and a countersupport 28 prior and subsequent to the cutting operation.

The configuration of countersupports 28, 28' with their recessed rim portions 29 and 29', respectively, permits the countersupports to be made of a plastic material.

This possibility is also applicable to separator arms 20.

Figure 8:
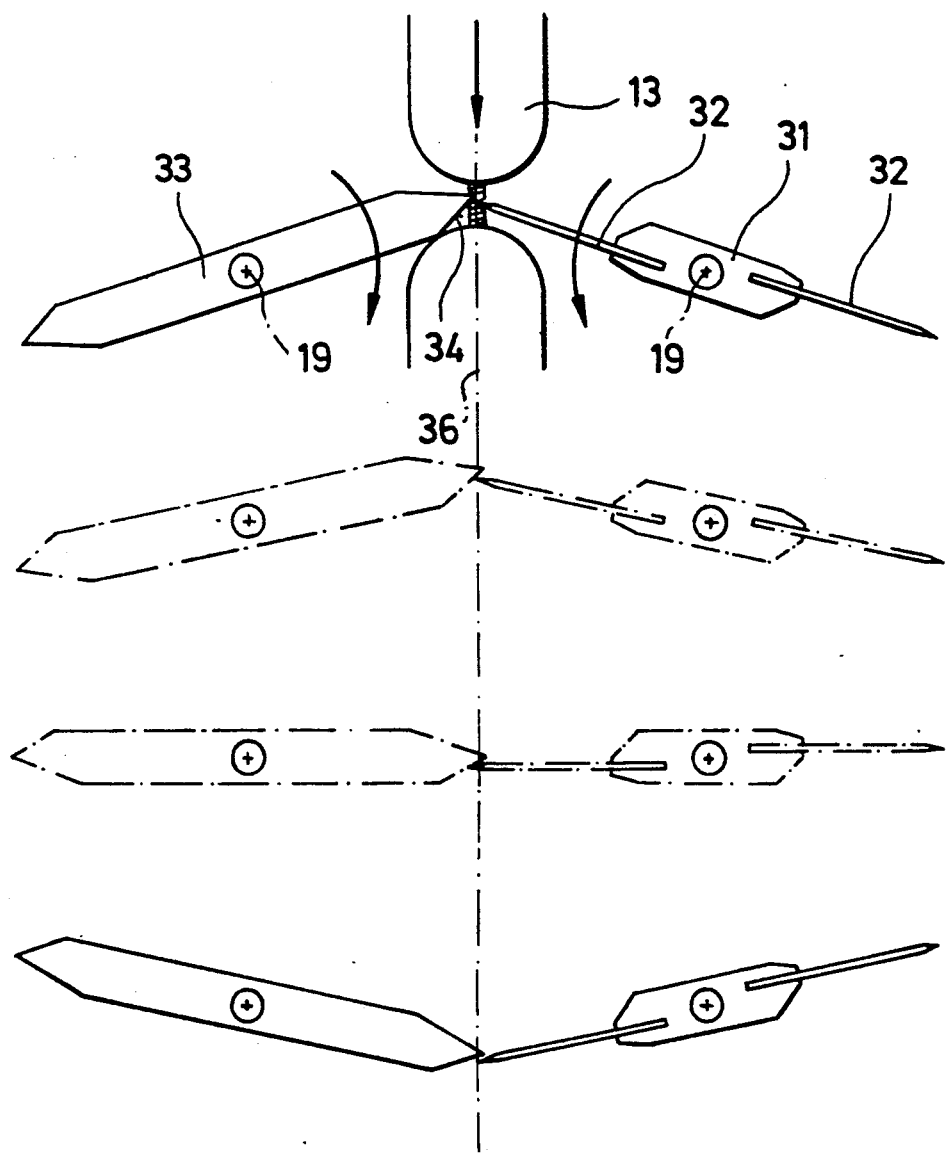
FIG. 8 is a top plan view of another modified embodiment of the separating device.
Figure 9:
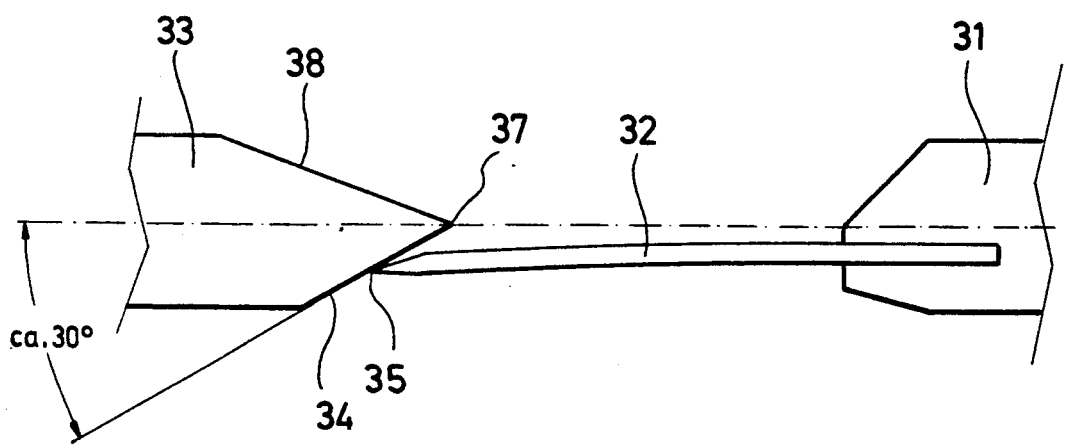
FIG. 9 is a detail of the device of FIG. 8.

In the separating device diagrammatically illustrated in FIGS. 8 and 9, one drive shaft 19 carries at least one separator arm 31 having attached thereto a blade 32 which may for instance be made of steel strip or a similarly resiliently flexible material.

As is evident from FIG. 9, blade 32 is ground from one side to form a cutting edge 35. Mounted on the other drive shaft 19 is at least one countersupport 33 having a chamfered end face 34. The manner in which cutting edge 35 of blade 32 cooperates with chamfered end face 34 of countersupport 33 is illustrated in FIG. 8. In the course of the rotation indicated by arrows, cutting edge 35 approaches chamfered end face 34 at the location of a sausage string constriction. At this stage, the centerlines of separator arm 31 and countersupport 33 form a blunt angle. As blade 32 and countersupport 33 continue to revolve, cutting edge 35 comes into contact with chamfered end face 34 and slides forwards thereon until blade 32 is in linear alignment with the centerline of countersupport 33. The respective intermediate positions are illustrated by dash-dotted lines in FIG. 8.

At this stage the leaf-spring nature of blade 32 permits cutting edge 35 to be resiliently held in contact with chamfered end face 34.

The revolving paths of the outer edge of countersupport 33 and blade 35 overlap one another so as to extend by about 0.5 mm to 1.5 mm over the dash-dotted centerline indicated at 36.

In the embodiment shown, the outer end of countersupport 33 is provided with another chamfered face 38 opposite chamfered end face 34, resulting in the formation of an edge 37 which may also act as a cutting edge. On the other hand, the provision of chamfered face 38 results in the advantage that the end portions of the sausages are not damaged by their contact with the countersupport arms.

When making sausages of greater length or groups of interconnected sausages, it may be advantageous to provide only a single separator arm on each drive shaft 19, in which case the cooperating separator arms may each be provided with a cutting blade. Otherwise one arm may carry a cutting blade, while the other one acts as a countersupport. The described apparatus operates as follows:

The sausage strand 5 emerging from stuffing machine 17 is entrained in rotation by brake ring 1, as the latter is rotated by electric motor 3 through transmission 2.

The oppositely revolving squeezer elements 9 come into engagement with sausage strand 5, their revolving speed being controlled so that their tangential speed substantially corresponds to the advancing speed of sausage strand 5 as determined by endless belts 10.

While it is being constricted by squeezer elements 9, sausage strand 5 continues to rotate until the previously twisted leading end of a sausage 13 is gripped between endless belts 10, so that a further constriction is formed at the trailing end of the sausage. The continued rotation of the trailing portion of sausage strand 5 will then result in the trailing end of the sausage being twisted.

The electronic control unit 4 controls the revolving speed of squeezer elements 9 in accordance with the length of the sausages to be made.

The thus divided, but still interconnected sausages are retained between endless conveyor belts 10 and fed to separating device 25. The revolving speed of the separator arms is variable by controlling the rotary speed of the electric motor 24 of the device by means of electronic control unit 4.

In order to ensure that the separator elements of the separating device, for instance blades 22, are brought to their cutting position at the exact location of a selected constriction between adjacent sausages 13, their operation may be suitably controlled in synchronism with or in proportion to that of squeezer elements 9. Control unit 4 may also act to control the revolving speed of separator arms 20 in such a manner that the separation is performed at each constriction or otherwise after a group of a selected number of sausages has passed the device. In the latter case, control unit 4 acts to reduce the revolving speed of separator arms 20, possibly down to zero, during the non-operative part of their revolution.

It is only at the instant of the separating operation or the pre-dividing operation, respectively, that the revolving speed of separator arms 20 or squeezer elements 9, respectively, is controlled so as to substantially correspond to the conveying speed of endless belts 10. This synchronized operation is already established when the separator arms or squeezer elements, respectively, are in an oblique position opposite a constriction between two sausages as illustrated in FIG. 7. At this stage the centerlines of separator arms 20 enclose an angle of about 90°, while their blades 22 are received in meshing engagement at the constriction between two sausages and subsequently revolve in substantial synchronism with the sausage conveying speed.

In extreme cases, it is also possible to cause the separator arms to move at an even faster speed than the conveying speed of endless belts over a selected angular range prior to the separating operation, and to subsequently reduce their speed.

The length of the separator arms, i.e. the diameter of the revolving path 26 of cutting edges 21, is determined in accordance with the diameter of the sausages to be separated. When the sausage diameter lies between 13 and 40 mm, a revolving path diameter of about 80 mm or less has been found very suitable, because it permits the diameter of the sausages being processed to be varied within a rather wide range. In the case of greater sausage diameters, the revolving path diameter should be correspondingly greater. The described apparatus permits a considerably greater number of sausages or groups of sausages to be processed per time unit than in the case of conventional separating devices.

The maximum possible separating performance is dependent on the following parameters:
Length of sausages,
conveyor belt speed,
number of interconnected sausages per group,
interaxial spacing of the separator element shafts,
number of separator elements per shaft (1 or 2),
engagement angle of the separator elements with the sausage string,
maximum admissible radial acceleration or deceleration, respectively.

In this context should be noted that the drive mechanism of endless conveyor belts 10 comprising electric motor 12 is of course also controlled by control unit 4, as is the electric motor 3 operating the twisting gear mechanism 2. In this manner it is possible to program all of the various movements for optimum synchronization.

Depending on the length of the sausages, the speed of the conveyor belts and the number of interconnected sausages in each group, the revolution of the separator elements and squeezer elements, respectively, may be accelerated or decelerated in their inoperative, disengaged state. In the case of sausages of greater length or of a greater number of interconnected sausages in each group, the revolution may even be stopped for a selected period of time at a neutral position.

We claim:

1. A method for separating a continuous sausage strand exiting from a sausage stuffing machine into individual sausages or groups of interconnected sausages, comprising discharging continuously a stuffed sausage strand from a stuffing machine, dividing said strand as it moves downstream from the machine into a string of interconnected sausages by periodically twisting the strand about its axis to form constrictions between the sausages, continuously conveying the thus divided sausage string at a conveying speed away from said dividing step while preventing the sausages from being rotated and maintaining them in longitudinal alignment, separating said string at preselected constrictions between said sausages with a pair of separator elements that rotate periodically into cooperation with each other to engage and cut the string, said elements rotating in synchronism about an axis on either side of the string in opposite circular paths in the conveying direction, the rotating speed of the separator elements being variable between an operative speed compatible with said conveying speed when they are in engagement with the string and a non-operative speed when they are disengaged from the string to thereby permit the separation of the string to be adjusted to sausages or group of sausages of different lengths.

2. The method of claim 1, wherein the sausages are pre-divided by a squeezing means prior to twisting comprising a pair of cooperating squeezer elements disposed opposite one another on either side of the strand that come into squeezing engagement with the strand to pre-divide it into individual sausages, said squeezer elements rotating in synchronism in the conveying direction, the rotating speed of said squeezer elements being variable between a speed compatible with the conveying speed when they are in engagement with the strand and a speed when they are disengaged from the strand to thereby permit variations in the length of the sausages.

3. The method of claim 2, wherein said sausage string is separated into individual sausages, said separator elements and squeezer elements revolving at the same speeds.

4. The method of claim 2, wherein said sausage string is separated into groups of interconnected sausages by reducing the revolving speed of said separator elements relative to the revolving speed of said squeezer elements.

5. Apparatus for separating a continuous sausage strand exiting from a sausage stuffing machine into individual sausages or groups of interconnected sausages comprising twisting means for rotating said sausage strand about its axis to divide it into a string of interconnected sausages separated from each other by a constriction, conveying means located downstream of the twisting means for conveying the divided sausage string away from the twisting means while preventing it from being rotated, separating means adjacent the conveying means for cutting the divided sausage string at the constrictions into individual sausages or groups of interconnected sausages, said separating means comprising a pair of separator arms mounted for rotation in opposite circular paths in the conveying direction on drive shafts perpendicular to the longitudinal axis of and on either side of the string and drive means for rotating said arms in synchronism to periodically bring them into cooperation with each other and a constriction to cut the string and control means for varying the rotational speed of the separator arms between an operative speed compatible with the speed of the conveying means when they are in engagement with a constriction and a non-operative speed when they are disengaged from the string to thereby permit adjustment of the cutting operation of the separator arms to sausages or groups of interconnected sausages of different lengths.

6. The apparatus of claim 5, including squeezing means downstream of said twisting means in the conveying direction of the sausage strand for pre-dividing the strand prior to its twisting, said squeezing means comprising a pair of squeezer elements mounted for rotation on opposite sides of the strand that periodically come into engagement with the strand to pre-divide it and drive means for rotating said squeezer elements in synchronism, said control means rotating said squeezer elements in proportion to the rotating speeds of said separator arms.

7. The apparatus of claim 5, in which said drive means for said separator arms comprises a variable-speed electric motor operatively connected to said control means and a transmission connected between it and said drive shafts.

8. The apparatus of claim 6, wherein said squeezer elements rotate on drive shafts and said drive means for said squeezer elements comprises a variable-speed electric motor operatively connected to said control means and a transmission connected between it and said squeezer element drive shafts.

9. The apparatus of claim 5, wherein said conveying means is a pair of spaced endless belt conveyor belts and drive means for translating said belts in the conveying direction in synchronism.

10. The apparatus of claim 9, wherein the drive means for said endless conveyor belts comprises a variable-speed electric motor operatively connected to said control means.

11. The apparatus of claim 5, wherein that each separator arm has a cutting blade on its outer peripheral end, the revolving paths of said blades overlapping one another when they are in engagement with a constriction in the string, one of said blades revolving at a offset angle of about 1° relative to the other blade.

12. The apparatus of claim 11, wherein the overlap of said revolving paths is from about 1 to 2 mm.

13. The apparatus of claim 5, wherein one of said separator arms has a cutting blade on its outer peripheral end while the other separator arm as a countersupport including a radially opening recess on its outer peripheral end for receiving the blade of the other arm.

14. The apparatus of claim 13, wherein the radially opening recess of said countersupport arm has a slot width of from above 1 to 2 mm.

15. The apparatus of claim 13, wherein said countersupport is of a plastic material.

16. The apparatus of claim 5, wherein one of said separator arms has a blade having a cutting edge on its outer peripheral end, while the other separator arm as a countersupport including a chamfered surface on its outer peripheral end, the cutting edge of said blade sliding on said chamfered edge of the other arm in a radial direction during the cutting operation.

17. The apparatus of claim 16, wherein said blade or said countersupport is resilient.

18. The apparatus of claim 5, wherein the diameter of the revolving paths of each separator arm is smaller than 80 mm when the sausage diameter is in the range of from 13 to 40 mm.

* * * * *